Nov. 25, 1969 — I. J. BRANDSTADTER — 3,480,932

ANALOG SPECTRUM ACCUMULATOR

Filed March 29, 1966

INVENTOR.
ISAAC JOSEPH BRANDSTADTER

BY

OSTROLENK, FABER, GERB & SOFFEN
ATTORNEYS

United States Patent Office 3,480,932
Patented Nov. 25, 1969

3,480,932
ANALOG SPECTRUM ACCUMULATOR

Isaac Joseph Brandstadter, Jerusalem, Israel, assignor to Yissum Research Development Company, Hebrew University, Jerusalem, Israel, a company of Israel Filed Mar. 29, 1966, Ser. No. 538,419
Claims priority, application Great Britain, Oct. 29, 1965, 45,810/65
Int. Cl. G11b 5/00
U.S. Cl. 340—174.1 15 Claims

ABSTRACT OF THE DISCLOSURE

Apparatus for increasing the signal-to-noise ratio of a recurring signal including means for producing an output signal representative of the algebraic sum of recurring signals previously received, and means for coupling that output signal to an accumulator to be added in synchronism with the next recurring signal.

This invention relates to the technique of spectrum accumulation and more particularly relates to a method for increasing the signal-to-noise ratio of a recurring signal whereby the recurring signal is continually accumulated upon itself for a predetermined number of times, the signal-to-noise ratio being increased because of the amplification of the synchronous signal relative to any synchronous (randomly distributed) information, such as noise. In this manner, a signal which is so weak that it would normally be buried in extraneous noise or in noise generated by measuring apparatus can be clearly displayed.

Equipment which performs the task of accumulation has appeared on the market, under names such as CAT (Computor of Average Transients), etc. All of these are based on elaborate digital computing circuitry, borrowed from the well established technique of the "Digital Multichannel Pulse-Height Analyzer." Such equipment generally is adapted to perform a number of functions, beside that of accumulation, but is available only at rather exorbitant prices. Besides the drawback of cost, the digital techniques available, may adversely affect the resultion whenever the available number of channels is insufficient.

In contradistinction thereto, the instant invention provides basically simple apparatus which performs spectrum accumulation in a satisfactroy way, at much lower cost, by using an analog computing technique. Such apparatus will reproduce all normally required data (relative peak-height, bandwidth, etc.) with high accuracy, and in addition thereto has the advantage of giving a truly continuous spectrum, which is to be contrasted with the discrete channel spectrum of the prior art digital technique.

In its preferred embodiment the invention includes an adder in combination with a closed loop magnetic tape, drum, or equivalent storage device equipped with recording, erasing, and reading heads. The first run of the recurring signal to be accumulated is fed to a first input of the adder and from the adder to the magnetic tape or drum. The output of the drum, as sensed by the reading head, is fed back to a second input of the adder wherein the algebraic sum of the first run of the synchronous signal and a newly developed second run of such signal is again delivered to the magnetic tape or drum which, in the meanwhile, has been cleared of its previous information by the erasing head. In this way, the synchronous or repeated information is continually accumulated while the asynchronous information, such as noise, which occurs randomly, is minimized with respect to the accumulation of the synchronous signal. Suitable readout means are provided to deliver the accumulated signal out of the aforementioned feedback circuit whereby the signal may be delivered to a recorder or other means of display. The simple apparatus described is a complete unit and may be used as it stands in many classes of measurements or spectra and in combination with many different signal generators.

It is an advantageous feature of the instant invention that the simple apparatus described above may be easily and conveniently modified to produce extremely accurate results especially for slowly varying input signals such as E.P.R. (electron paramagnetic resonance) and N.M.R. (nuclear magnetic resonance) spectra. In such an embodiment the output of the signal generating apparatus being utilized, such as a spectrometer, is first transformed by a chopper-synchroverter, the working frequency of which will be chosen sufficiently high such that relative to it, the signal generated by the signal generator is a fairly slowly varying signal. Hence such slowly varying signal may be considered a "quasi DC" signal which after being transformed by the chopper-synchroverter into an AC signal appears at the input terminal of the adder or accumulating means. The output of the adder is again fed into a recording head and the process of signal accumulation follows exactly the same line as explained above. Preferably, the aforementioned readout means will contain, in addition, a synchronous demodulator or, as it is also called, a phase-sensitive detector which will restore the accumulated signal to its "quasi DC" original form.

The main difference between the basic system and that which is utilized in combination with a slowly varying input signal and chopper-synchroverter is that synchronization mechanism is added in order to assure that the accumulated signal being fed back to the second input of the adder or accumulating device reaches such second input at the exact same time and in phase with the successive runs of the input signals which are applied through the chopper-synchroverter to the first input of the adding device.

The preferred embodiment for accomplishing and synchronization is similar to the basic accumulation system but preferably includes a dual track closed loop magnetic tape instead of the single track loop required for the basic arrangement. Correspondingly, the second track of the magnetic tape includes auxiliary recording and reading heads by which a synchronizing signal may be temporarily stored on the second track of the tape, which synchronizing signal has been impressed on such second track by a synchronizing signal generator operating at the same high frequency which is necessary to drive the chopper-synchroverter noted above. The synchronizing mechanism further includes a circuit means by which the synchronizing signal read off the second track by the auxiliary reading head may be fed back to the chopper-synchroverter for activation thereof.

In operation, before starting the first run of the signal to be accumulated, the high frequency synchronizing signal is impressed on the second track of the magnetic tape by means of the synchronizing signal generator and auxiliary recording head. When the synchronizing signal on the second track reaches the front of the auxiliary reading head it is fed through the above noted circuit means to the chopper-synchroverter for activation thereof such that the first run of the signal to be accumulated may now be fed into the first input terminal of the accumulating device. As there is no accumulated signal being fed into the second input of the accumulating device at this time, the output signal of the accumulator is simply the first run of the signal to be accumulated and is fed through the main recording head onto the first track of the magnetic tape in the manner described for the basic system outlined above.

Simultaneously the synchronizing signal read by the auxiliary reading head is passed through an additional feedback circuit back to the auxiliary recording head where it is again impressed upon the second track of the magnetic tape, only this time at exactly the same time and in phase with the output signal being applied to the first track by the accumulating device. (The synchronizing signal generator will have been deactivated, by suitable means, at the same instant when the leading edge of the synchronizing signal will reach the auxiliary reading head.) Thus the first run of the signal to be accumulated and the synchronizing signal are inscribed in their respective tracks simultaneously and exactly in phase.

During successive runs, the main reading head and the auxiliary reading head will read the accumulated output signal and the synchronizing signal, respectively, at the same time whereby it necessarily follows that the synchronizing signal will be applied to the chopper-synchroverter to generate the next run of the signal to be accumulated, at the same time as the accumulated output signal will be fed back to the second input terminal of the accumulating device, and at the same time as the synchronizing signal is reimpressed on the second track of the tape.

The same process is repeated in all successive runs where, in addition, the second input terminal of the adder will receive the sum of all previous runs in the manner described for the basic system. With the exact phase relationship established by the synchronizing mechanism thus described, the addition performed by the accumulating device will be algebraic.

It is another advantageous feature of the instant invention to utilize a component of the synchronizing signal which is read by the auxiliary reading head to control the course of generation of the signal to be accumulated, in those cases, such as with spectrometers, where this is feasible.

In the preferred embodiment of this feature of the invention the aforementioned synchronizing signal generator generates an amplitude modulated synchronizing signal which is capable of being separated into AC and DC components. Further, the circuit which feeds the synchronizing signal from the auxiliary reading head to the chopper-synchroverter includes a separator whereby the amplitude modulated synchronizing signal may be separated into its AC and DC components. The AC component is fed to the chopper-synchroverter to provide the driving frequency therefor, while the DC component may be utilized to control the course of input signal generation, for example, in controlling the sweep of the magnet over the measuring range of an E.P.R. or N.M.R. spectrometer which generates the input signal to be accumulated.

As another feature of the instant invention, the main feedback circuit comprising the added, the main recording head, the magnetic tape, the main reading head and the second input of the adder may be provided with automatic gain control means whereby the gain of such enumerated loop may be maintained at unity thereby inherently compensating for undesirable variations in the components of such loop during operation. Similarly, it is a feature of the instant invention that the additional feedback loop utilized for feeding the amplitude-modulated AC synchronizing signal back from the auxiliary reading head to the auxiliary recording head may be provided with similar automatic gain control means whereby the gain of such loop will be maintained equal to unity.

Accordingly, it is an object of the instant invention to provide an analog spectrum accumulator for increasing the signal-to-noise ratio of a recurring signal whereby a signal which is so weak that normally it would be buried in noise, may be clearly displayed.

It is another object of the instant invention to provide such apparatus for increasing the signal-to-noise ratio of a recurring signal which includes an accumulating device for producing an output signal representative of the total of signals applied to first and second input terminals thereof; input means for successively applying an input signal to the first input of the accumulating device; and a feedback circuit responsive to the output signal of the accumulating device for applying such output signal to the second input terminal of the accumulating device as a successive input signal is applied to the first input terminal by the input means.

Still another object of the instant invention is to provide an analog spectrum accumulator which is relatively simple, accurate, and which may be produced at a much lower cost that the relatively complex digital computing circuitry which has been utilized for performing such accumulation in the past.

Yet another object of the instant invention is to provide such an analog spectrum accumulator which in itself is satisfactory for analog accumulation for many types of input signals which are to be accumulated.

Still another object of the instant invention is to provide such analog spectrum accumulator which may be easily modified so as to assure exact synchronization of the application of the aforementioned accumulated output signal and the next recurring input signal.

It is another object of the instant invention to utilize such a synchronized analog spectrum accumulator for the control and synchronization of the generator which is being utilized to produce such recurring input signal.

Yet another object of the instant invention is to provide such an analog spectrum accumulator which includes automatic gain control means for assuring that the gain of feedback loops utilized therein is maintained at unity.

Other objects and a fuller understanding of the instant invention may be had by referring to the following description and drawings, in which.

Figure 1:
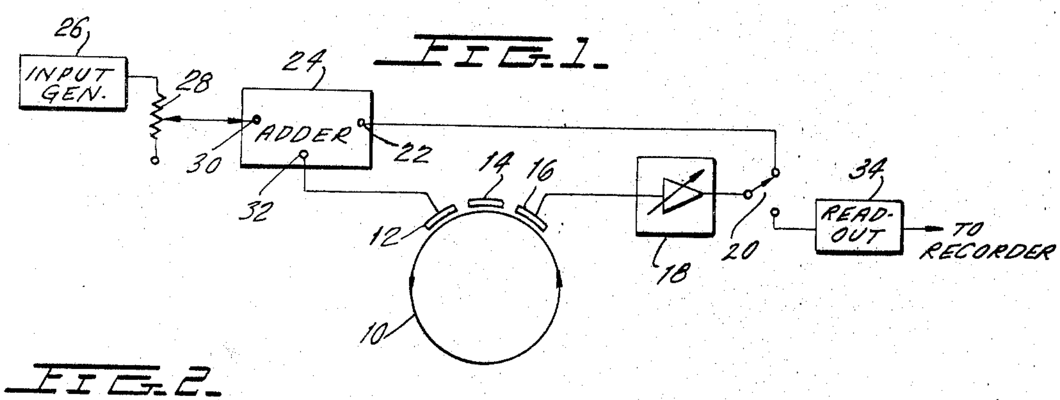
FIGURE 1 is a schematic circuit diagram of the basic analog spectrum accumulator of the instant invention.

Referring to FIGURE 1, it may be seen that the heart of the analog spectrum accumulator of the instant invention is a closed loop rotating magnetic tape, drum, or equivalent storage media 10 rotating in the sense indicated. The storage device is equipped with main recording head 12, erasing head 14, and main reading head 16. Associated equipment normally required in conjunction with the heads, such as amplifiers, oscillators, etc. form no part of the instant invention and hence are not shown in FIGURE 1.

Information recorded on storage device 10 by recording head 12 approaches and is read by reading head 16; passes through gain control means 18 (which may be automatic or not), to be described in greater detail, and switch 20 (in the position shown in FIGURE 1) to the second input terminal 22 of an analog adding unit 24. The signal to be accumulated is fed from the input signal generating device 26 into an input attenuator 28, the purpose of which will be described in greater detail, and from there to the first input terminal 30 of the adding unit 24.

At the output terminal 32 of adder 24 appears the algebraic sum of the signals fed into terminals 30 and 22 which is then delivered to recording head 12 and inscribed on the storage device 10, be it tape, drum or equivalent storage means. Erasing head 14 continually clears off all previous information, thereby assuring that the recording head 12 always finds a fresh section of the storage device 10 on which to inscribe.

In operation, the first run of the signal to be accumulated is fed from the input generator 26 through input attenuator 28 into the first input terminal 30 of adder 24, input 22 getting a zeroed input signal at this time (note that nothing has been accumulated thus far). Thus the first run of the singal to be accumulated is recorded on the storage device 10.

When the information stored on 10 reaches the main reading head 16 it is passed through gain control means 18, switch 20 and to the second input terminal 22 of adder 24. Simultaneously the second run of the input signal is fed through input attenuator 28 to the first terminal 30 of adder 24. In this way the sum of the first and second runs which appears at output terminal 32 of adder 24 will be delivered to recording head 12 to be inscribed on storage device 10. As noted previously, the erasing head 14 assures that the recording head 12 always finds a fresh section of the storage device 10 for the inscription of the new accumulated output signal.

Thus it can be seen that any consecutive run, say the $K^{th}$, will be added to the sum of the $K-1^{th}$ previous runs recorded on the storage device 10 and fed through 16, 18 and 20 into the input terminal 22 of adder 24 such that the $K^{th}$ sum will appear at the output terminal 32 of adder 24 to be recorded on storage device 10.

After a sufficient number of runs have been accumulated the output of reading head 16 will be directed by switch 20 into a readout unit 34 which delivers a suitably amplified signal to a recorder or any other means of display. Where continuous monitoring of the accumulating signal is desired, readout unit 34 would be equipped with an input-stage of sufficiently high input-impedance, and connected permanently to the loop. Switch 20 will be dispensed with in this case. In this way the repeated information is continually accumulated while the asynchronous information, such as noise, which occurs randomly, is minimized with respect to the accumulation of the synchronous signal.

The gain control means 18, to be described in greater detail, allows the total loop gain (of the loop 32, 12, 10, 16, 18, 20 and 22) to be set as close to unity as possible. When automatic gain control means is utilized, it will inherently compensate for variations of the various components during operation, assuring that gain will remain close to unity for long periods.

The simple circuit described, and depicted by FIGURE 1, can be used as it stands for many classes of input signals generated by many types of signal generators. For other classes, especially for slowly varying input signals and where high accuracy is required, synchro-inversion and synchronous detection of signal is used, and a synchronizing circuit is added to the basic circuit of FIGURE 1 to assure simultaneous application of the input signal to input terminal 30 and of the accumulated output signal which is fed back through the feedback loop to the input terminal 22. Such a circuit is shown in FIGURE 2.

Figure 2:
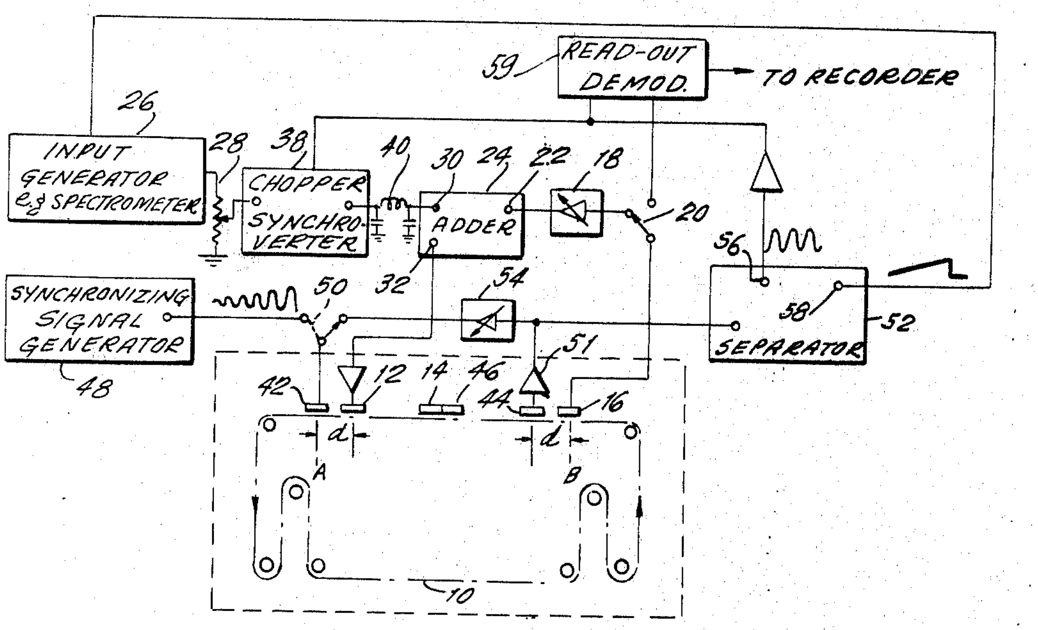
FIGURE 2 is a schematic diagram of the basis analog spectrum accumulator of FIGURE 1 as modified to assure synchronization of the application of various signals utilized therein.

Referring to FIGURE 2, the output signal of the input generator 26, which might be a spectrometer, is passed through the input attenuator 28, a chopper-synchroverter 38, to be described in greater detail, and a low-pass filter 40 to the input terminal 30 of adder 24. The working frequency of the chopper-synchroverter 38 will be chosen sufficiently high, such that with relation to it, the input signal from the generator is a slowly varying signal which may be considered, relative to the frequency of the chopper-synchroverter, as a "quasi DC" signal. Thus the mean value of the input signal in any short interval of time (which must comprise however several cycles of the chopper frequency) is considered to be its "instantaneous DC value" which may be of either sign. This "quasi DC" signal, conveniently attenuated by attenuator 28 for optimization of the dynamic range, is now transformed by the chopper-synchroverter 38 into an AC signal, which after having passed through low-pass filter 40, appears at the input terminal 30 of the adder 24 as a fairly good sine wave, whose amplitude is proportional to the "instantaneous DC value" of the signal. The output signal appearing at output terminal 32 of adder 24 is again fed into the recording head 12, and the process of signal accumulation follows exactly the same line as explained above in connection with FIGURE 1.

Having specifically identified the particular input means utilized in the circuit of FIGURE 2, the additional main difference between the circuits of FIGURE 2 and FIGURE 1 is that in FIGURE 2 a synchronization mechanism is added to synchronize the application of the input signal and accumulated output signal to the input terminals 30 and 22, respectively, of adder 24. Specifically, the storage device 10 is a dual track closed loop magnetic tape (or drum) instead of the single track loop of FIGURE 1. Correspondingly, FIGURE 2 features an auxiliary recording head 42, an auxiliary reading head 44 and an auxiliary erasing head 46. Alternatively, the two separate erasing heads 14 and 46 may be combined in a common erasing head which would span both tracks of the dual track magnetic tape.

Throughout the remainder of this specification, for convenience, the storage device 10 will be identified as a magnetic tape. However, it is to be understood that when such terminology is used it is intended to encompass tape, drum or any other storage device capable of storing information thereon.

For ease of identification, the Roman number I will hereafter refer to the first track of magnetic tape 10 which is utilized in conjunction with main reading and recording heads 12 and 16, respectively; while the Roman number II will be used to identify the track which is utilized in conjunction with the auxiliary recording and reading heads 42 and 44, respectively.

Before starting the first run of the signal to be accumulated, a signal of that frequency which has been chosen as the most convenient working frequency of the chopper-synchroverter 38, is generated by the synchronizing signal generator 48, passed through switch 50, which at this time will occupy the dotted position shown in FIGURE 2, and recorded on the useful length of track II by auxiliary recording head 42. The useful length of the tape 10 is the total length of the tape minus a piece whose length is slightly greater than the region of the heads, that is, from A to B in FIGURE 2.

Figure 3:
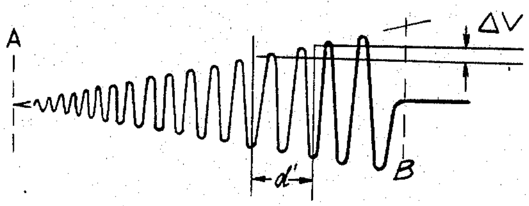
FIGURE 3 is a representation of the synchronizing signal utilized in the embodiment of FIGURE 2.

This synchronizing signal (whose frequency is that necessary to drive the chopper-synchroverter 38) may be amplitude modulated (not necessarily linearly) as shown in FIGURE 3. As will be described in greater detail, the amplitude modulation of the synchronizing signal may be utilized for continuously synchronizing the course of generation of the input signal with the course of revolution of the tape. In the event that such synchronization is unnecessary or should be accomplished by other means, the amplitude modulation of the synchronizing signal may be omitted.

The generation of the synchronizing signal will be stopped automatically and switch 50 thrown into the solid line position shown, by any appropriate means, when the beginning of such signal will have just arrived in front of auxiliary reading head 44, thus completely filling the aforementioned useful length of track II with the synchronizing signal. The first run of the accumulation may now begin in the following manner.

The leading edge of the synchronizing signal enters auxiliary reading head 44 and feeds through a pre-amplifier 51 into a separator 52 on one hand; and at the same time through gain control means 54, which may be similar to the gain control means 18. The separator 52 has two outputs 56 and 58 from which the separated AC and DC components of the synchronizing signal, respectively, may be extracted. The DC component, in the appearance of a sawtooth, as indicated in FIGURE 2, may be utilized to control the course of input signal generation by the input generator 26 which, as noted before, may be a spectrometer. In case of an E.P.R. or N.M.R. spectrometer the DC component could control the sweep of the magnet of the spectrometer in order to synchronize same with the accumulated signal arriving at 22 of adder 24.

The AC component from output 56 of the separator 52 is used after amplification to drive the chopper-synchroverter 38. Thus the working frequency of the chopper-synchroverter 38 will be exactly equal to the frequency of the synchronizing signal recorded on track II, and they will be exactly in phase at all times.

Thus when the leading edge of the synchronizing signal will have just entered the auxiliary reading head 44, the chopper-synchroverter 38 will begin to operate and pass the first spectrum run (which because of the sawtooth control signal at output 58 of separator 52, is also just at its beginning) through chopper synchroverter 38 whereby it is transformed to alternating current and applied to the input terminal 30 of adder 24.

The output signal appearing at terminal 32 of adder 24 is recorded by main recording head 12 on track I of the tape 10, while at the same time the synchronizing signal is re-recorded on track II through the additional feedback circuit comprising auxiliary reading head 44, amplifier 51, gain control means 54, switch 50, now in its solid line position, and auxiliary recording head 42.

It is thus seen that the first spectrum run and the synchronizing signal are inscribed in their respective tracks simultaneously and exactly in phase.

When the first spectrum run and the synchronizing signal approach the main reading head 16 and auxiliary reading head 44 (both at the same time), the following events occur simultaneously. First, the first spectrum is fed from reading head 16 through gain control means 18 to the second input terminal 22 of adder 24. Simultaneously the synchronizing signal is separated into AC and DC components by separator 52, whereby the AC output at terminal 56 energizes the chopper-synchroverter 38, while the DC component at terminal 58 as noted before, may be utilized to synchronize the production of the successive input signal. Thus the synchronizing mechanism assures that the next successive spectrum run and the previous accumulated spectrum run will be applied to the input terminals 30 and 22, respectively, of the adder 24 at the same time and in exact phase relationship.

The same process is repeated in all successive runs where, in addition, input terminal 22 of adder 24 receives the sum of all previous runs in the, by now, well known manner. The addition performed by adder 24 will be algebraic, thanks to the exact phase relationship achieved by the synchronizing mechanism. By inverting the phase of the chopper-synchroverter (which can be done most simply by throwing a switch, not shown in FIGURE 2), the adder 24 will perform subtraction in place of addition. This is useful, for example, for the subtraction of a steady background spectrum. When, at the end, the accumulated signal is fed by throwing switch 20 into the readout demodulator 59, which performs synchronous rectification, a substantial increase in signal-to-noise ratio will result, as is well known. Continuous monitoring could be achieved by making the readout device a part of the feedback loop as explained with respect to FIGURE 1.

Although the components of the systems shown in FIGURES 1 and 2 are currently available in the prior art, and in fact, individually form no part of the instant invention, a few comments directed thereto would be appropriate at this point. With respect to the input attenuator 28, it is to be noted that the signal to be accumulated should be attenuated such as to make a compromise between the conflicting requirements of high signal-to-noise ratio, (S/N), and of large dynamic range. Thus too high an attenuation will result in poor signal-to-noise ratio; while with too slight an attenuation, the higher peaks of a spectrum might sum up, after a given number of runs, to excessive amplitudes which exceed the linear range of the instrument.

With respect to the chopper-synchroverter 38, it is the task of such unit to convert the quasi DC input of the slowly varying input signal into an AC output of the proper phase with respect to a given reference phase. This is a well established technique, and synchroverters are available of the mechanical and electronic type. For low frequencies the mechanical type is largely used. It is simply an electromechanical vibrator driven by a power source of the desired frequency and equipped with a number of contact pairs which close and open at the rhythm of the vibration. As explained previously the synchroverter 38, whether it be of the mechanical or electronic type, is driven by the AC component of the synchronizing signal on track II, whose frequency and phase serve as the working frequency and the reference phase, respectively, for the synchroverter 38.

The filter 40 is a simple low-pass filter which should remove most of the harmonic content of the chopper-synchroverter output and leave a fairly good sine wave to be transmitted to the adder 24.

Figures 4, 5:
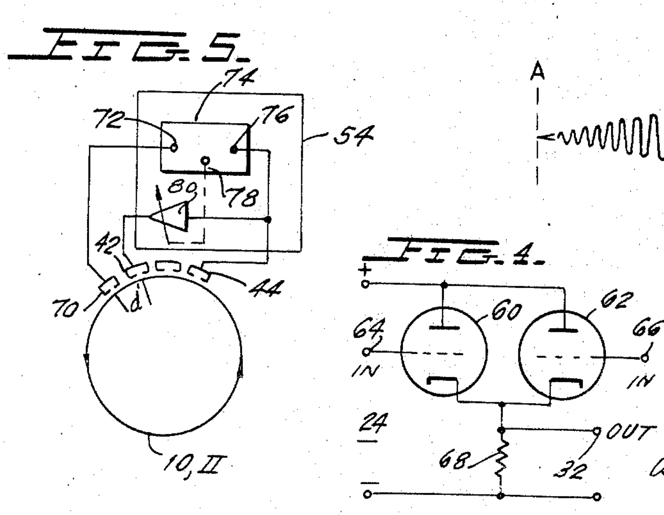
FIGURE 4 is a circuit diagram of one possible adding device which could be utilized in the embodiment of FIGURES 1 and 2.
FIGURE 5 is a circuit diagram of an automatic gain control circuit which might be utilized in the embodiments shown in FIGURES 1 and 2.

The adder can be a simple analog device such as that shown in FIGURE 4 which includes a pair of tubes 60 and 62, the grids 64 and 66 of which would correspond to the input terminals 30 and 32, respectively, in FIGURES 1 and 2. The output across resistor 68 would correspond to the output terminal 32 in FIGURES 1 and 2.

The circuit of FIGURE 4 has a theoretical amplification or gain .5 (i.e., for inputs $a$ and $b$, respectively, the output would be $(a+b)/2$) and in a practical circuit will be even less. However, the particular gain does not matter since the total loop gain from adder 24 through recording head 12, tape 10, reading head 16, and back to adder 24 will be maintained as close to unity as possible by means of the gain control means 18 provided for this end. Similarly, the gain in the loop including auxiliary reading head 44, amplifier 51, switch 50, auxiliary recording head 42 and track II of tape 10 will be maintained as close to unity as possible by the gain control means 54. (This, of course, is needed only when modulation of the synchronizing signal is used.) Gain control means 18 and 54 will also contain the necessary phase-correction networks, to reduce the total phase shifts to zero.

Although FIGURE 4 shows one particular embodiment of an adder, which may be used in the instant invention, it is to be understood that such adder has been disclosed merely for the purpose of illustration and explanation and is in no way intended to limit the instant invention thereto.

The storage device 10 may be a dual track closed loop magnetic tape recorder comprising two recording heads, two reading heads and one common erasing head. Alternatively a dual track magnetic drum, or other equivalent storage storage system may be used. Although in no way intended to be limited by such disclosure, it has been found most convenient to utilize a four track stereophonic tape recorder of a type presently available for home use. The use of stereophonic reading and recording heads eliminates the need for adjustment of the relative distances between the auxiliary and main recording and reading heads, respectively, such as the distance represented by the distances $d$ in FIGURE 2. These distances must be equal to within a very small fraction of the wave-length used in order to maintain proper synchronization; and in stereophonic heads, by construction, $d$ is equal to zero with sufficient accuracy.

In case the input signal generator is an E.P.R. or N.M.R. spectrometer, its adaptation for use in combination with the instant invention is particularly simple and inexpensive since the sawtooth DC component generated by separator 52 in FIGURE 2 has simply to be substituted for the internal sawtooth of the magnet scanning unit of such spectrometers.

FIGURE 5 shows one possible embodiment of the gain control means 18 and 54 which is of the automatic type and which may be utilized to maintain the gain of the respective loops thereof as close to unity as possible. For simplicity of explanation, FIGURE 5 will show gain control means 54 of the automatic type utilized in the closed loop including track II of tape 10, but it is to be understood that similar apparatus may be provided for gain control means 18 in the closed loop which includes track I of tape 10.

Placed adjacent auxiliary recording head 42 and separated by distance *d'* therefrom is an additional reading head 70 which monitors the synchronizing signal which is inscribed on track II of tape 10 by the auxiliary recording head 42. The signal read by additional reading head 70 is passed to a first input 72 of a comparator 74. The second input 76 of comparator 74 receives the synchronizing signal read by auxiliary reading head 44. The comparator 74 produces an error signal at the output 78 which is representative of the discrepancy between the signal read by heads 70 and 44, respectively. Such error signal is applied to a variable gain amplifier 80, the gain of which is increased or decreased in accordance with the magnitude of the error signal developed by the comparator 74. The output of variable gain amplifier 80 is fed to auxiliary recording head 42 to reinscribe the synchronizing signal on the tape 10 in the manner previously described.

It should be noted that in the case of an increasing amplitude modulated synchronizing signal such as that shown in FIGURE 3, because of the separation *d'* between heads 42 and 70, there is an inherent discrepancy indicated as $\Delta v$ in FIGURE 3 between the magnitudes of the synchronizing signal recorded by recording head 42 and read by reading head 70. This difference can be easily corrected, however, by adding a small constant voltage increment of magnitude $\Delta v$ to the output voltage of the additional reading head 70. It is to be noted that although gain control means 54 has been described in a somewhat detailed manner and as automatic, other means for maintaining the gain of a closed loop equal to unity are presently available and may be substituted therefor while still remaining within the scope of the instant invention. For For example, non-automatic gain control means in the form of a variable gain amplifier with preset control, or a preset attenuator might be utilized.

There has thus been described a relatively simple analog spectrum accumulator and the manner in which such accumulator may be extended to receive synchronizing mechanism capable of accurately synchronizing the application of various signals utilized therein.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Apparatus for increasing the signal-to-noise ratio of a recurring signal, said apparatus comprising:

accumulating means for producing an output signal representative of the total of signals applied to first and second input terminals thereof;

input means for successively applying a recurring input signal to said first input terminal of said accumulating means; and feedback means responsive to said output signal of said accumulating means for applying said output signal to said second input terminal of said accumulating means, with said feedback means including synchronization means for applying said output signal to said second input terminal in synchronism with a successive recurring input signal being applied to said first input terminal by said input means.

2. The apparatus of claim 1, wherein said feedback means includes temporary storage means for delaying the application of said output signal to said second input terminal of said accumulating means to synchronize the application of said output signal to said second input terminal with the application of a successive recurring input signal to said first input terminal.

3. The apparatus of claim 2, wherein said temporary storage means includes: a rotating closed loop storage device; recording means positioned at a predetermined position relative to said storage device for feeding said output signal onto said rotating storage device beginning at a first location thereon; and reading means positioned at a second predetermined position, a predetermined distance from said recording means, for extracting said output signal from said rotating storage device once said first location approaches said reading means and for passing said output signal to said second input terminal of said accumulating means.

4. The apparatus of claim 3, wherein said rotating closed loop storage device comprises a magnetic tape.

5. The apparatus of claim 4, and further including erasing means positioned between said recording and reading means for clearing said tape of said output signal after said output signal has been extracted from said tape by said reading means.

6. The apparatus of claim 4, wherein said accumulating means includes an output terminal for producing said output signal, and said feedback means comprises a closed loop feedback circuit including said output terminal, said recording means, said magnetic tape, said reading means, said second input terminal, and gain control means for maintaining the gain of said closed loop feedback circuit equal to unity.

7. Apparatus for increasing the signal-to-noise ratio of a recurring signal, said apparatus comprising:

accumulating means for producing an output signal representative of the total of signals applied to first and second input terminals thereof;

input means for successively applying an input signal to said first input terminal of said accumulating means; and feedback means responsive to said output signal of said accumulating means for applying said output signal to said second input terminal of said accumulating means as a successive input signal is applied to said first input terminal by said input means;

wherein said feedback means includes temporary storage means for delaying the application of said output signal to said second input terminal of said accumulating means until said input means applies said successive input signal to said first input terminal;

wherein said temporary storage means includes: a rotating closed loop storage device; recording means positioned at a predetermined position relative to said storage device for feeding said output signal onto said rotating storage device beginning at a first location thereon; and reading means positioned at a second predetermined position, a predetermined distance from said recording means, for extracting said output signal from said rotating storage device once said first location approaches said reading means and for passing said output signal to said second input terminal of said accumulating means; and wherein said rotating closed loop storage device includes auxiliary storage means for temporarily storing a synchronizing signal utilized for synchronizing the application of said output signal and said successive input signal to said first and second input terminals of said accumulating means, respectively.

8. The apparatus of claim 7, and further including synchronizing signal generating means for generating said synchronizing signal; auxiliary recording means positioned at said first predetermined position for feeding said synchronizing signal onto said auxiliary storage means; auxiliary reading means positioned at said second predetermined position for extracting said synchronizing signal from said auxiliary storage means, and circuit means connected between said auxiliary reading means and said input means for activating said input means at the same time as said output signal is passed to said second input terminal of said accumulating means by said reading means.

9. The apparatus of claim 8, wherein said input means includes synchroverting means operable at a predetermined frequency selected relative to said input signal for converting said input signal to AC; and said synchronizing signal generating means generates said synchronizing signal at said predetermined frequency; said circuit means being connected between said auxiliary reading means and said synchroverting means for driving said synchroverting means to thereby apply said converted input signal to said first input terminal at the same time as said output signal is passed to said second input terminal by said reading means.

10. The apparatus of claim 9, wherein said input means further includes input signal generating means for generating said input signal; said synchronizing signal generating means generates a synchronizing signal which is separable into AC and DC components; and said circuit means includes separator means for separating said AC and DC components, said AC components being applied to said synchroverting means to drive same, and said DC component being applied to said input signal generating means to synchronize same with said accumulating means.

11. The apparatus of claim 8, and further including feedback circuit means connected between said auxiliary reading means and said auxiliary recording means for refeeding said synchronizing signal onto said auxiliary storage means at the same time as said output signal is fed onto said closed loop storage device by said recording means; whereby said reading means and said auxiliary reading means will extract said output and synchronizing signal, respectively, at the same time such that said synchronizing signal will be applied to said input means to activate same at the same time as said output signal will be fed to said second input terminal of said accumulating means.

12. The apparatus of claim 11, and further including gain control means for maintaining the gain of the loop which includes said auxiliary recording means, said auxiliary storage means, said auxiliary reading means, and said feedback circuit means, equal to unity.

13. The apparatus of claim 12, wherein said gain control means includes additional reading means positioned adjacent said auxiliary recording head for sampling the synchronizing signal impressed on said auxiliary storage means by said auxiliary recording means; comparator means responsive to said additional and auxiliary reading means for generating an error signal representative of the difference between the synchronizing signals extracted by said additional and auxiliary reading means; and variable gain amplifier means connected in said feedback circuit means between said auxiliary reading and recording means and responsive to said error signal for varying the magnitude of said synchronizing signal refed onto said auxiliary storage means by said auxiliary recording means in accordance with the variation in said error signal, such as to reduce said error signal substantially to zero.

14. The apparatus of claim 7, wherein said rotating closed loop storage device and said auxiliary storage means is a dual track closed loop magnetic tape.

15. The apparatus of claim 9, wherein said feedback means includes demodulator means for converting said converted input signal back to its original form.

References Cited

UNITED STATES PATENTS

| | | | |
|---|---|---|---|
| 2,674,660 | 4/1954 | Ambrose | 179—100.2 |
| 2,804,499 | 8/1957 | Butts | 179—100.2 |
| 3,378,825 | 4/1968 | Offner | 340—174.1 |

BERNARD KONICK, Primary Examiner

WILLIAM F. WHITE, Assistant Examiner

U.S. Cl. X.R.

179—100.2